(12) United States Patent
Pretty

(10) Patent No.: US 9,782,945 B2
(45) Date of Patent: Oct. 10, 2017

(54) PLY DROPS IN COMPOSITE SANDWICH PANELS

(71) Applicant: ROHR, INC., Chula Vista, AZ (US)

(72) Inventor: Michael Sean Pretty, Jamul, CA (US)

(73) Assignee: ROHR, INC., Chula Vista, CA (US)

( * ) Notice: Subject to any disclaimer, the term of this patent is extended or adjusted under 35 U.S.C. 154(b) by 186 days.

(21) Appl. No.: 14/662,813

(22) Filed: Mar. 19, 2015

(65) Prior Publication Data

US 2016/0271900 A1 Sep. 22, 2016

(51) Int. Cl.
*B32B 3/26* (2006.01)
*B32B 3/12* (2006.01)
*B32B 37/14* (2006.01)
*B29D 99/00* (2010.01)

(52) U.S. Cl.
CPC .......... *B32B 3/263* (2013.01); *B29D 99/0021* (2013.01); *B32B 3/12* (2013.01); *B32B 3/266* (2013.01); *B32B 37/146* (2013.01); *B32B 2605/18* (2013.01)

(58) Field of Classification Search
CPC ....... B32B 2605/18; B32B 3/12; B32B 3/263; B32B 3/266; B32B 37/146; B64C 3/26
See application file for complete search history.

(56) References Cited

U.S. PATENT DOCUMENTS

2008/0179448 A1* 7/2008 Layland ................. B64D 15/12
   244/1 N
2011/0135887 A1* 6/2011 Saff .......................... B32B 3/06
   428/192

* cited by examiner

*Primary Examiner* — Catherine A Simone
(74) *Attorney, Agent, or Firm* — Snell & Wilmer, L.L.P.

(57) ABSTRACT

A structural panel for an aircraft nacelle may comprise a first skin, a second skin, and a core sandwiched between them. One of the skins may comprise regions of different thicknesses. The regions of different thicknesses may be separated by a ramp, in which the number of composite plies in the first skin varies. A slope of the ramp may vary across the ramp to prevent disbonding of the core from the skin at the base of the ramp.

15 Claims, 5 Drawing Sheets

PLY DROPS IN COMPOSITE SANDWICH PANELS

FIELD

The present disclosure relates to composite sandwich panels, and more particularly, to a method of dropping plies in such a sandwich panel to vary the thickness of the skins while minimizing potential defects and stress concentrations.

BACKGROUND

Composite sandwich panels, comprising two skins sandwiching between them a core structure (such as honeycomb core) is an efficient structural building block used in aerospace and other fields. For instance, nacelles which house the gas turbine engines on a common commercial transport airplane use composite sandwich panels to form the inner barrel of the inlet, the inner fixed structure of the thrust reverser, and the translating sleeve (of a translating sleeve type thrust reverser). When a component is made of composite sandwich panels, its weight and other properties may be optimized by varying the type of core and number and direction of composite plies in the skins according to the strength and other requirements in a given section of the component. Varying the number of plies may vary the thickness, stiffness and strength of the skins. A ply drop is the term used to describe where a ply ends and does not continue across a contiguous area of skin. When several plies are to be dropped, the ply drops are staggered to avoid a large discontinuity. However, stress concentrations and possible disbonds to the core structure due to the discontinuity remain as problems to be addressed.

SUMMARY

A structural panel for an aircraft nacelle may comprise a core and a first skin coupled to the core. The first skin may comprise a first region having a first thickness, a second region having a second thickness greater than the first thickness, and a ramp between the first region and the second region, wherein a first slope at a first point of the ramp is greater than a second slope at a second point of the ramp.

A skin for a composite panel may comprise a first composite ply, a second composite ply coupled to the first composite ply, a third composite ply coupled to the second composite ply, a fourth composite ply coupled to the third composite ply, and a fifth composite ply coupled to the fourth composite ply. A first ply drop ratio from the first composite ply to the second composite ply may be less than a second ply drop ratio from the second composite ply to the third composite ply, wherein the second ply drop ratio is less than a third ply drop ratio from the third composite ply to the fourth composite ply, and wherein the third ply drop ratio is less than a fourth ply drop ratio from the fourth composite ply to the fifth composite ply.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
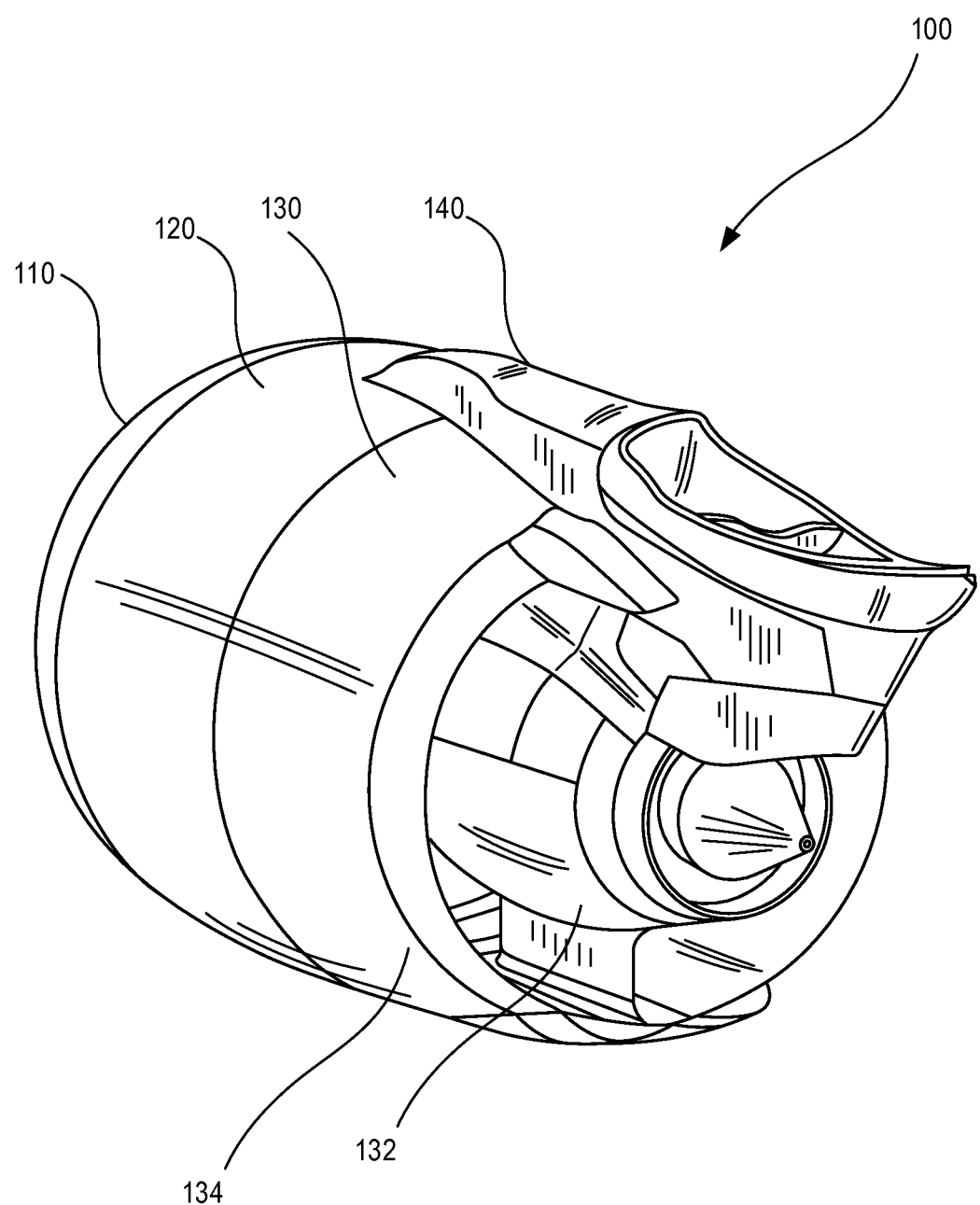
FIG. 1 illustrates a perspective view of a nacelle for an aircraft in accordance with various embodiments.

Referring to FIG. 1, a nacelle 100 for a gas turbine engine is illustrated according to various embodiments. Nacelle 100 may comprise an inlet 110, a fan cowl 120, and a thrust reverser 130. Nacelle 100 may be coupled to a pylon 140, which may mount the nacelle 100 to an aircraft wing or aircraft body. Thrust reverser 130 may comprise an inner fixed structure ("IFS") 132, an outer fixed structure ("OFS"), and a translating sleeve 134. Bypass air from an engine fan may flow in a generally annular bypass air duct defined between the IFS 132 and the translating sleeve 134. Portions of the inner fixed structure 132, the translating sleeve 134, and the inlet 110 may be commonly formed using composite sandwich panels.

Figure 2:
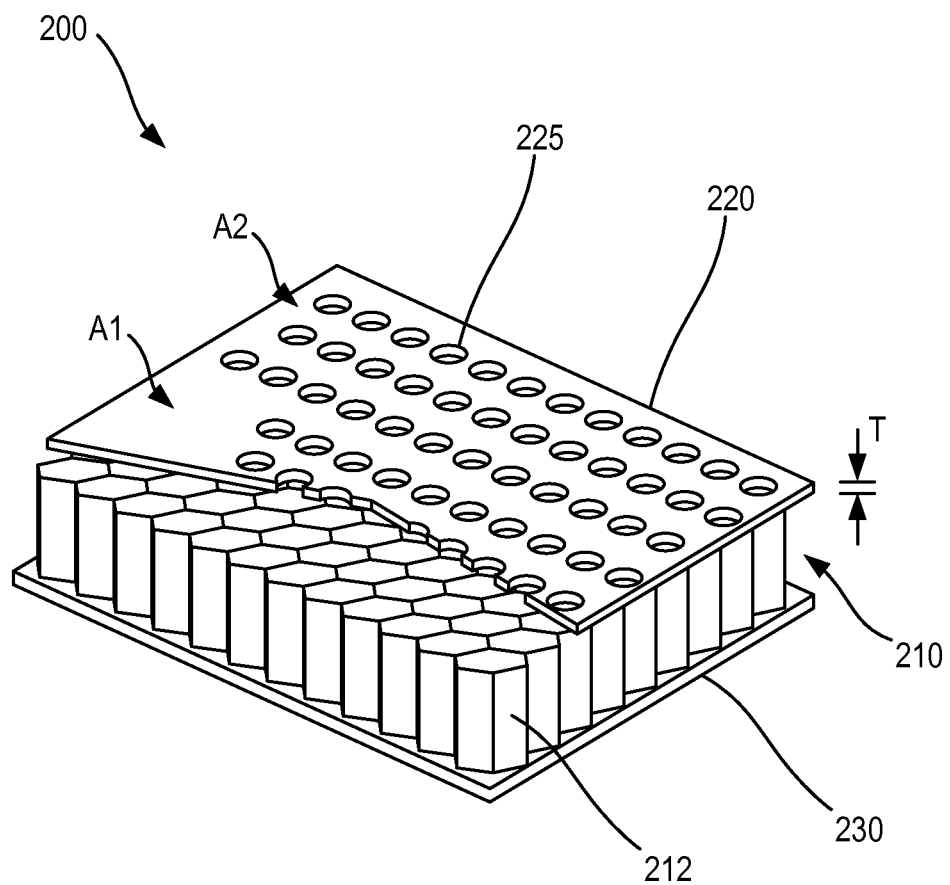
FIG. 2 illustrates a perspective view of a sandwich panel in accordance with various embodiments.

Referring to FIG. 2, a composite sandwich panel 200 is illustrated according to various embodiments. The composite sandwich panel 200 may be an acoustic panel with perforations 225, and could be used to form portions of a nacelle for an aircraft engine, as described above. The composite sandwich panel 200 may comprise a core 210, positioned between a first skin 220 and a second skin 230. The core 210 may have walls extending generally in a normal direction from the first skin to the second skin that form a plurality of cells 212. The cells 212 may be hexagonal in shape and are then commonly referred to as honeycomb core. Or the cells 212 could have any of a number of different shapes. Core walls could be made from various metals such as titanium or aluminum, or composites, or hardened paper or other plastics, according to the particular application and required material properties. The core walls may be bonded together with glue or welding or other methods to form the cellular structure. The first skin 220, core 210, and second skin 230 combine to form closed cells that may become resonator chambers when one of the skins is perforated and work to attenuate acoustic waves, such as noise from an aircraft engine, in a known fashion. The first and second skins 220, 230 may be formed of laminar plies of fiber reinforcement joined together with a matrix. The fibers may be carbon, glass, or other known types. The matrix may be thermoset polymers such as epoxies, thermoplastics, and other known materials. The composite sandwich panel 200 is formed by joining together the first skin 220, second skin 230, and core 210, which may be done with glue, co-curing, mechanical fastening, or through other means.

In a component formed from composite sandwich panel 200, the thicknesses T and other properties of skins 220, 230 may be varied to optimize properties. For example, one region A1 of the component may need to withstand high bending or pulling stresses, or may need to withstand fastener pull-through forces, more than another region A2. In such a case, the thicknesses of skins 220, 230, the thicknesses of walls in the core 210, and the densities of the cellular structure of core 210 can all be varied according to need, as is well understood by those of ordinary skill in this art.

Figure 3:
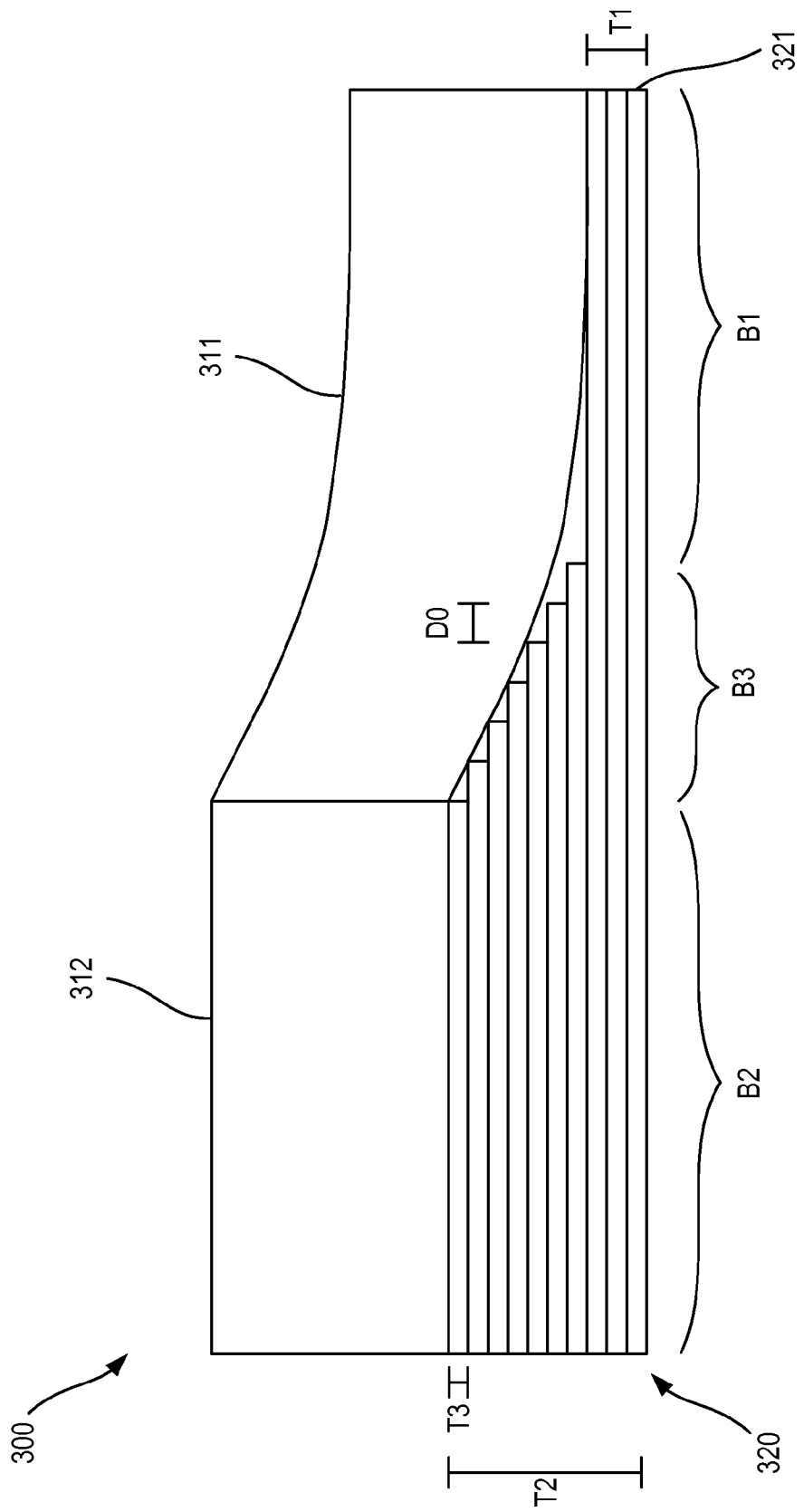
FIG. 3 illustrates a cross-section view of a prior art skin with ply drops and core structure interface.

Referring to FIG. 3, an enlarged cross-section view of a portion of a prior art structural panel 300 is illustrated. The structural panel 300 may comprise a first skin 320 comprised of a plurality of composite laminar plies 321. The first skin 320 may comprise fewer composite plies 321 in a first region B1 than in a second region B2. The lesser number of composite plies 321 may result in the thickness T1 of the first skin 320 in the first region B1 being less than the thickness T2 in the second region B2.

In the illustrated structural panel 300, the first skin 320 in the first region B1 comprises three composite plies 321, and the second region B2 comprises ten composite plies 321. The transitional region B3 between the first region B1 and the second region B2 may comprise a varying number of composite plies 321. The transitional region B3 may comprise a constant slope, such that the distance between ply drops is equal for each adjacent pair of ply drops. The industry standard is for the transitional region B3 to have a slope of 0.05. Thus, for composite plies with a thickness T3 of 0.005 inches (0.013 cm), the distance D0 between ply drops is 0.1 inches (0.25 cm).

A first core structure 311 and a second core structure 312 are attached to the first skin 320. The first core structure 311 may be coupled to the first region B1 and the transitional region B3 of the first skin 320. The second core structure 312 may be coupled to the second region B2. The first core structure 311 may be formed as a flat core. However, the first core structure 311 may be forced to bend at the base 322 of the transitional region B3. This is often done when joining together the two skins that sandwich the core. The skins are compressed together to ensure surface contact between the inside surfaces of the skins and the core walls. The bend may result in a slight separation between the first core structure 311 and the first skin 320. If the separation is too large, the separation may be classified as a disbond, and the structural panel 300 may need to be repaired or discarded, which may be time consuming and costly.

Figure 4:
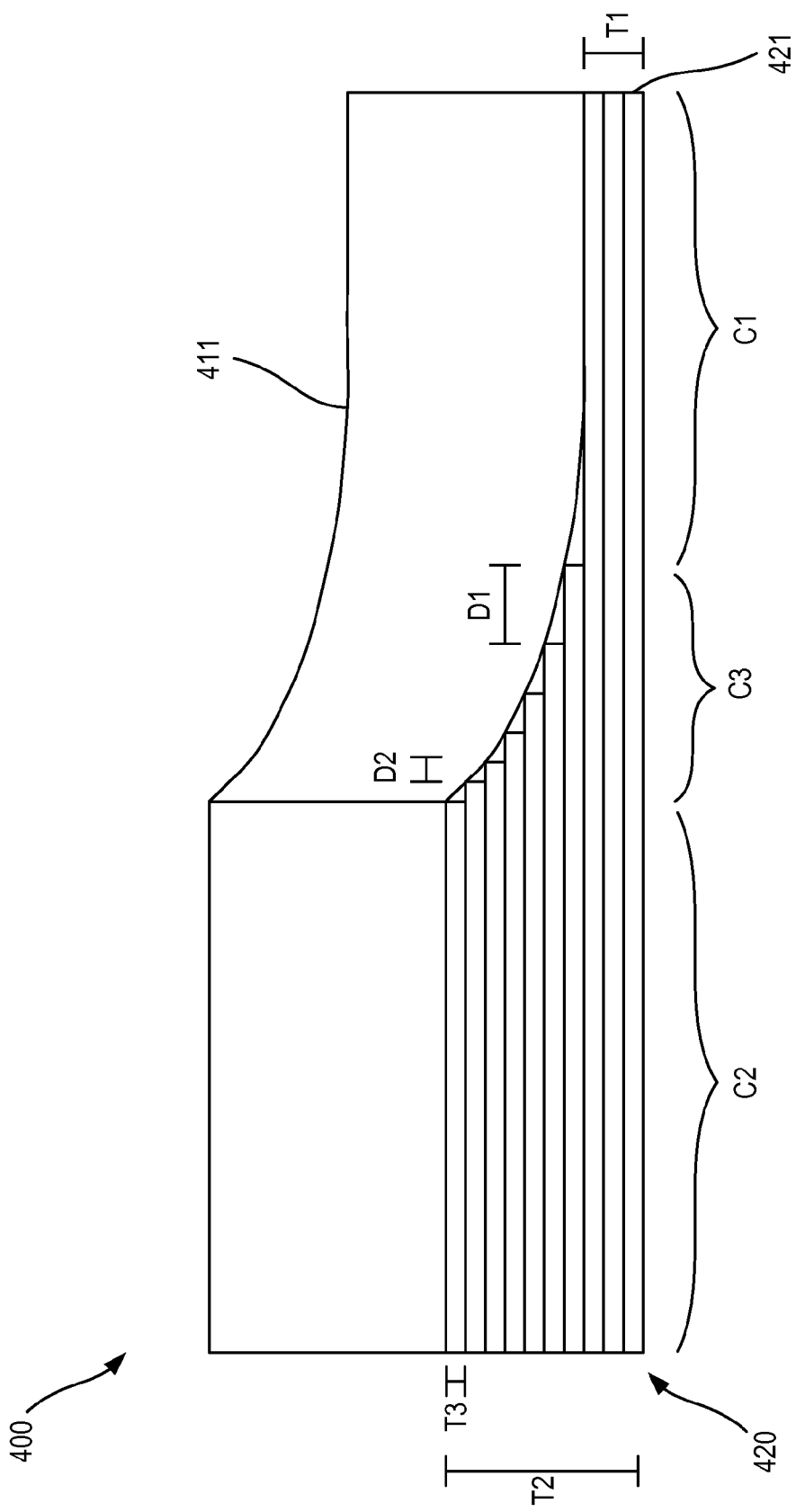
FIG. 4 illustrates a cross-section view of a structural panel in accordance with various embodiments.

Referring to FIG. 4, a cross-section view of a structural panel 400 having a transitional region C3 with a varying slope is illustrated according to various embodiments. The slope in the transitional region C3 may gradually increase from the base of the ramp adjacent to the first region C1 having a relatively smaller thickness T1 to the second region C2 having a relatively larger thickness T2. For example, at the base of the ramp, the distance D1 between ply drops may be forty times greater than the thickness T3 of a ply. Thus, the ramp may comprise a ply drop ratio of 40:1 (i.e. a slope of 0.025) at the base of the ramp. However, the slope may increase with each successive ply drop toward the top of the ramp. For example, at the top of the ramp, the distance D2 between ply drops may be only ten times greater than the thickness T3 of a ply 421 of the first skin 420. Thus, the ramp may comprise a ply drop ratio of 10:1 (i.e. a slope of 0.1) at the top of the ramp. In various embodiments, the slope may be relatively small at the base of the ramp and increase to a constant higher slope throughout the ramp. For example, a first portion of the ramp may have a constant first slope, and a second portion of the ramp may have a second constant slope.

By gradually changing the slope throughout the transitional region C3, the first core section 411 may gradually curve to match the profile of the ramp. Thus, although the average slope in the transitional region C3 may be equal to the average slope in the structural panel illustrated in FIG. 3, the localized rate of change of the slope at the base of the ramp in the structural panel 400 is much less. This may decrease the likelihood of a disbond occurring at the base of the ramp.

Figure 5:
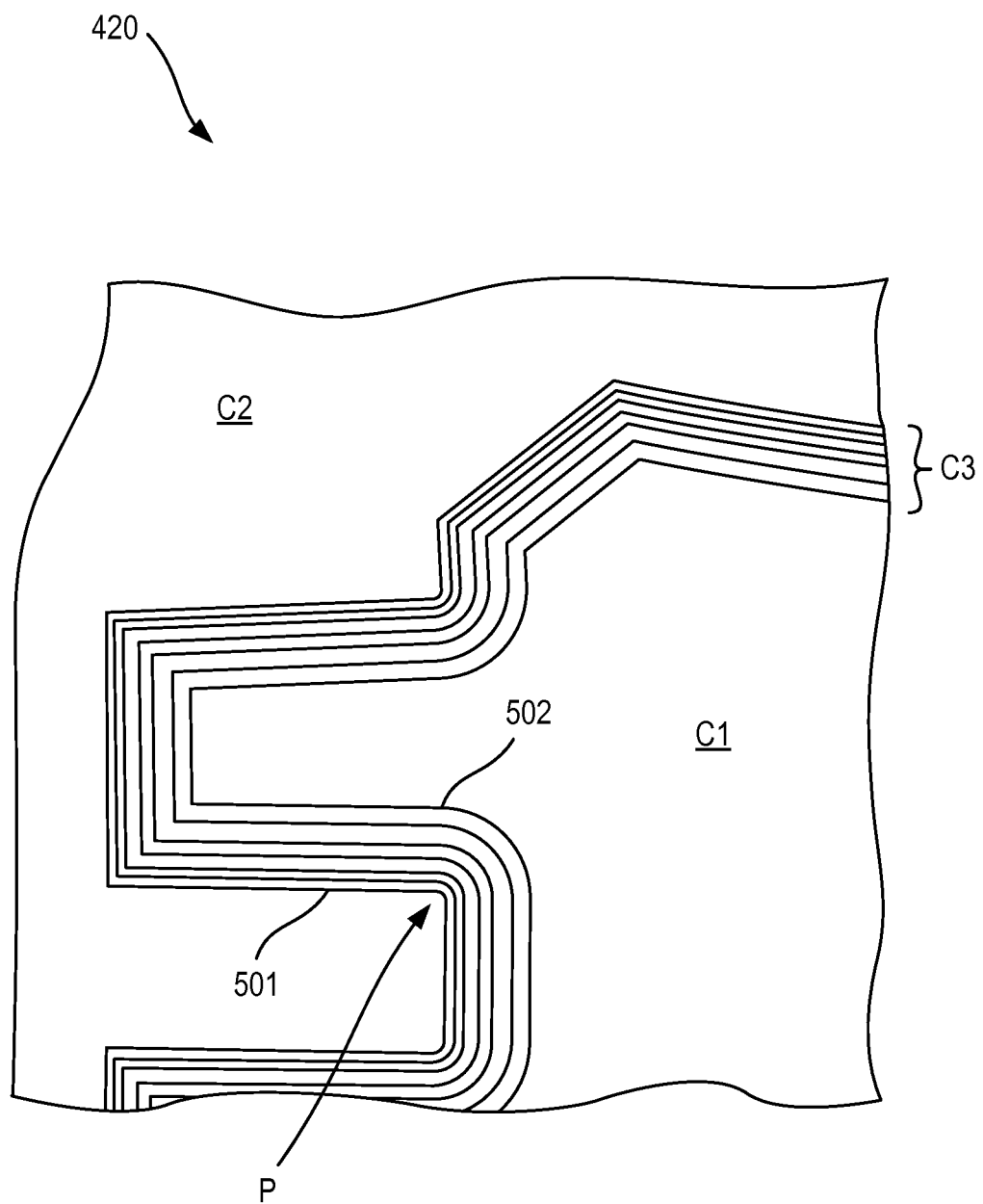
FIG. 5 illustrates a plan view of a skin in accordance with various embodiments.

Referring to FIG. 5, a plan view of the first skin 420 is illustrated according to various embodiments. Structural panels may comprise complex density patterns to meet various design considerations. Thus, the transitional region C3 between the first region C1 and the second region C2 may follow a complex 2-dimensional pattern. As described with reference to FIG. 4, the slope in the transitional region C3 may gradually increase from the base of the ramp adjacent to the first region C1 having a relatively smaller thickness to the second region C2 having a relatively larger thickness. In some locations, such as at point P, the 2-dimensional pattern of the transitional region C2 may make a sharp corner. A single core structure may bend up the ramp on both sides of the corner at point P. Because the core structure is bending in different directions on either side of the corner, the core structure may experience a stress at the corner. This may cause the core structure to disbond from the first skin 420.

However, by creating ply shapes with successively increasing radii about point P, the stress may be distributed over a larger area. For example, the top composite ply 501 at the top of the ramp may comprise a first radius, and a bottom composite ply 502 at the base of the ramp may comprise a second radius. The second radius may be larger than the first radius. The radius of each composite ply between the top composite ply 501 and the bottom composite ply 502 may increase from the first radius to the second radius.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. A structural panel for an aircraft nacelle comprising:
a core; and
a first skin coupled to the core, wherein the first skin comprises a first region having a first thickness, a second region having a second thickness greater than the first thickness, and a ramp between the first region and the second region, wherein a first slope at a first point of the ramp is greater than a second slope at a second point of the ramp, wherein a ply drop ratio is less than 20:1 in a location adjacent to the second region.

2. The structural panel of claim 1, wherein the first region comprises a first plurality of composite plies, and the second region comprises the first plurality of composite plies and a second plurality of composite plies.

3. The structural panel of claim 1 wherein the ply drop ratio is greater than 20:1 in a location adjacent to the first region.

4. The structural panel of claim 1, wherein the first region comprises perforations configured to attenuate noise.

5. The structural panel of claim 1, wherein a first composite ply at a top of the ramp comprises a first radius about a corner, and wherein a second composite ply at a bottom of the ramp comprises a second radius about the corner, and wherein the second radius is larger than the first radius.

6. The structural panel of claim 5, wherein each composite ply between the first composite ply and the second composite ply comprise a radius larger than the first radius and smaller than the second radius.

7. The structural panel of claim 1, wherein the core comprises a plurality of honeycomb cells.

8. A structural panel for an aircraft nacelle comprising:
a core; and
a skin coupled to the core, wherein the skin comprises a first region having a first thickness, a second region having a second thickness greater than the first thickness, and a ramp between the first region and the second region, wherein a first slope at a first point of the ramp is greater than a second slope at a second point of the ramp, wherein the skin further comprises:
a first composite ply;
a second composite ply coupled to the first composite ply;
a third composite ply coupled to the second composite ply;
a fourth composite ply coupled to the third composite ply; and
a fifth composite ply coupled to the fourth composite ply;
wherein a first ply drop ratio from the first composite ply to the second composite ply is less than 20:1 and is less than a second ply drop ratio from the second composite ply to the third composite ply, wherein the second ply drop ratio is less than a third ply drop ratio from the third composite ply to the fourth composite ply, and wherein the third ply drop ratio is less than a fourth ply drop ratio from the fourth composite ply to the fifth composite ply.

9. The skin of claim 8, wherein the first composite ply, the second composite ply, the third composite ply, the fourth composite ply, and the fifth composite ply form the ramp.

10. The skin of claim 8, wherein the fourth ply drop ratio is greater than 20:1.

11. The skin of claim 8, wherein the first region comprises a plurality of perforations configured to attenuate noise.

12. The skin of claim 8, wherein the first composite ply comprises a first radius, wherein the second composite ply comprises a second radius greater than the first radius, and wherein the third composite ply comprises a third radius greater than the second radius.

13. A structural panel for an aircraft nacelle comprising:
a core; and
a first skin coupled to the core, wherein the first skin comprises a first region having a first thickness, a second region having a second thickness greater than the first thickness, and a ramp between the first region and the second region, wherein a first slope at a first point of the ramp is greater than a second slope at a second point of the ramp,
wherein a first composite ply at a top of the ramp comprises a first radius about a corner, and wherein a second composite ply at a bottom of the ramp comprises a second radius about the corner, and wherein the second radius is larger than the first radius.

14. The structural panel of claim 13, wherein each composite ply between the first composite ply and the second composite ply comprise a radius larger than the first radius and smaller than the second radius.

15. The structural panel of claim 13, wherein the core comprises a plurality of honeycomb cells.

* * * * *